United States Patent
Okusako

(10) Patent No.: US 7,303,738 B2
(45) Date of Patent: Dec. 4, 2007

(54) METHOD FOR PRODUCING TITANIUM OXIDE

(75) Inventor: Kensen Okusako, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 234 days.

(21) Appl. No.: 10/732,367

(22) Filed: Dec. 11, 2003

(65) Prior Publication Data

US 2004/0120885 A1 Jun. 24, 2004

(30) Foreign Application Priority Data

Dec. 20, 2002 (JP) .............................. 2002-369748

(51) Int. Cl.
*C01G 23/04* (2006.01)
*C01G 23/053* (2006.01)
*C01G 23/08* (2006.01)

(52) U.S. Cl. ..................... 423/608; 423/609; 423/610

(58) Field of Classification Search ................ 423/114, 423/123, 131, 608, 609, 610, 69
See application file for complete search history.

(56) References Cited

U.S. PATENT DOCUMENTS

| | | | |
|---|---|---|---|
| 2,480,092 A | 8/1949 | Whately | |
| 4,165,239 A | 8/1979 | Linden et al. | |
| 5,011,674 A | 4/1991 | Yoshimoto et al. | |
| 6,013,372 A | 1/2000 | Hayakawa et al. | |
| 2002/0005145 A1 | 1/2002 | Sherman | |
| 2002/0012628 A1 | 1/2002 | Sawabe et al. | |
| 2002/0021999 A1 | 2/2002 | Sakatani et al. | |
| 2002/0051746 A1 | 5/2002 | Okusako | |
| 2003/0027704 A1 | 2/2003 | Sakatani et al. | |
| 2003/0161784 A1 | 8/2003 | Okusako et al. | |
| 2003/0220194 A1 | 11/2003 | Sakatani et al. | |
| 2003/0236317 A1 | 12/2003 | Sakatani et al. | |
| 2004/0037772 A1* | 2/2004 | Sawabe et al. | ............. 423/610 |
| 2004/0067193 A1 | 4/2004 | Sakatani et al. | |

FOREIGN PATENT DOCUMENTS

| DE | 44 10 662 B1 | 9/1995 |
|---|---|---|
| EP | 0 666 107 A2 | 8/1995 |
| EP | 0 675 086 A2 | 10/1995 |
| EP | 0 846 494 A1 | 6/1998 |
| EP | 1 031 538 A1 | 8/2000 |
| EP | 1 065 169 A1 | 1/2001 |

(Continued)

OTHER PUBLICATIONS

J. H. Keenan, F. G. Keyes, P. G. Hill, and J.G. Hill and J. G. Moore, Steam Tables, Wiley, New York, 1969.*

(Continued)

Primary Examiner—Wayne A. Langel
Assistant Examiner—James Fiorito
(74) Attorney, Agent, or Firm—Sughrue Mion, PLLC

(57) ABSTRACT

The present invention provides a method for producing a titanium oxide. The method can be applied to produce a titanium oxide having a large specific surface area. The method typically entails calcinating at least one titanium oxide precursor selected from a titanium hydroxide and titanium peroxide, wherein the calcination occurs in the presence of nitrogen and at a steam pressure of at most about 8,000 Pa.

8 Claims, 2 Drawing Sheets

FOREIGN PATENT DOCUMENTS

| | | |
|---|---|---|
| EP | 1 095 908 A1 | 5/2001 |
| EP | 1 127 844 A1 | 8/2001 |
| EP | 1 138 634 A1 | 10/2001 |
| EP | 1 160 202 A1 | 12/2001 |
| EP | 1 174 392 A1 | 1/2002 |
| EP | 1 279 643 A2 | 1/2002 |
| EP | 1 178 011 A1 | 2/2002 |
| EP | 1 188 718 A2 | 3/2002 |
| EP | 1 199 103 A2 | 4/2002 |
| EP | 1 205 244 A1 | 5/2002 |
| EP | 1 219 569 A2 | 7/2002 |
| EP | 1 285 953 A1 | 2/2003 |
| EP | 1 338 564 A2 | 8/2003 |
| FR | 2 677 012 A1 | 12/1992 |
| GB | 764084 | 12/1956 |
| JP | 62-207718 A | 9/1987 |
| JP | 09071418 * | 3/1997 |
| JP | 10-67516 A | 3/1998 |
| JP | 2000-140636 A | 5/2000 |
| JP | 2001-96168 A | 4/2001 |
| JP | 2001-98220 A | 4/2001 |
| JP | 2001-278627 A | 10/2001 |
| JP | 2003-48715 A | 2/2003 |
| JP | 2003-171578 A | 6/2003 |
| JP | 2003-221230 A | 8/2003 |
| WO | WO 96/29375 A1 | 9/1996 |
| WO | WO 00/01921 A1 | 3/2000 |
| WO | WO 00/18686 A1 | 4/2000 |
| WO | WO 01/56928 A1 | 8/2001 |
| WO | WO 02/40609 A1 | 5/2002 |

OTHER PUBLICATIONS

M. Miyauchi et al., "Reversible wettability control of $TiO_2$ surface by light irradiation," *Surface Science*, 511, (2002), pp. 401-407.

R. Asahi et al., "Visible-Light Photocatalysis in Nitrogen-Doped Titanium Oxides", *Science*, vol. 293, Jul. 13, 2001, pp. 269-271.

Shinri Sato, "Photocatalytic Activity of $NO_x$-Doped $TiO_2$ in the Visible Light Region", *Chemical Physics Letters*, vol. 123, No. 1,2, Jan. 3, 1986, pp. 126-128.

E. Kanezaki et al., "Solid-state Chemistry of Thermally Induced Yellow Coulouring in Synthetic Hydrous Titanium Oxide fromTiCl3", *J. Chem. Soc. Faraday Trans.*, vol. 88, No. 24, 1992, pp. 3583-3586.

Database WPI, Section Ch, Week 199802, Derwent Publications, Ltd., XP-00226023.

Abstract of Fang et al., "Preparation of fine spherical titania particles by thermolysis of the peroxo complex", *STN Chemical Abstracts*, vol. 120, No. 8, Feb. 21, 1994 (XP-002139805).

Patent Abstracts of Japan, vol. 1997, No. 7, Jul. 31, 1997.

* cited by examiner

METHOD FOR PRODUCING TITANIUM OXIDE

TECHNICAL FIELD OF THE INVENTION

The present invention relates to a method for producing a titanium oxide. More specifically, the present invention relates to a method for producing a titanium oxide having a large specific surface area, which is useful as a catalyst.

BACKGROUND OF THE INVENTION

Titanium oxide has been widely utilized as a catalyst. For example, titanium oxide has been used as a hydrogenation catalyst for producing higher alcohols and as a carrier for a catalyst treating exhaust gas. Given such circumstances, the uses of titanium oxide has been expanded and a titanium oxide having a high specific surface area has been desired.

It has been known that titanium oxide can be produced by a method of hydrolyzing a titanium compound such as a titanium sulfate and a titanium chloride to obtain a titanium hydroxide and calcining the titanium compound. However, by such conventional method, it has been difficult to produce a titanium oxide having a large surface area.

SUMMARY OF THE INVENTION

One of objects of the present invention is to provide a method for producing a titanium oxide having a large specific surface area. The method typically comprises the step of calcining at least one titanium oxide precursor selected from a titanium hydroxide and a titanium peroxide, wherein said calcination is conducted in the presence of nitrogen molecules and at a steam pressure of at most about 8,000 Pa.

DETAILED DESCRIPTION OF THE INVENTION

Figure 1:
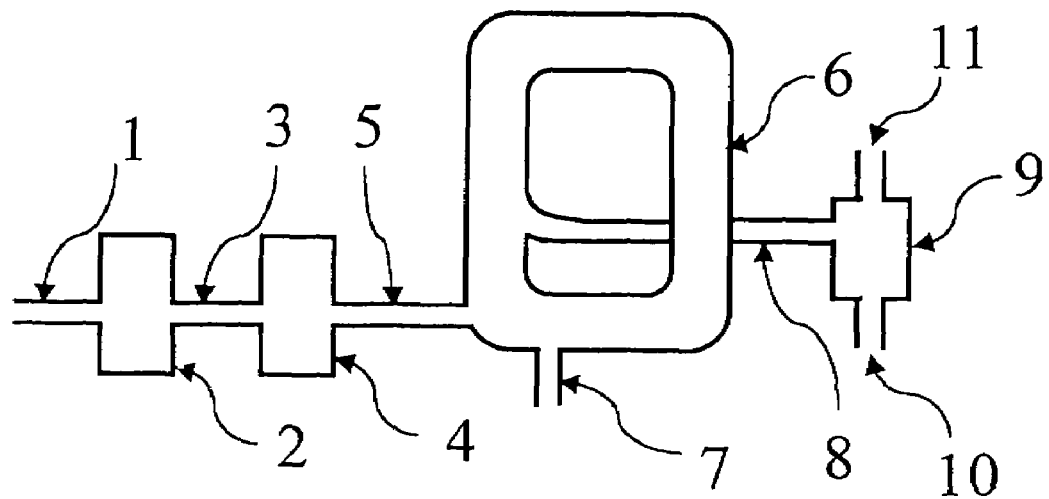
FIG. 1 shows a schematic diagram of an air-blow furnace which can be used in the present invention.

In the present invention, a titanium oxide precursor is calcined to produce a titanium oxide.

The titanium oxide precursor is at least one compound selected from a titanium hydroxide and a titanium peroxide. Examples of the titanium hydroxide include $Ti(OH)_2$, $Ti(OH)_3$, $Ti(OH)_4$, $TiO(OH)_2$ and the like. The titanium hydroxide can be produced by a method in which a titanium compound in an aqueous solution thereof is reacted with a base. Examples of a titanium compound that can be utilized in such a method include a titanium chloride, a titanium oxychloride, a titanium sulfate, a titanium oxysulfate and the like. The utilized base may be a sodium hydroxide, a sodium carbonate, a sodium hydrogencarbonate, a potassium hydroxide, a potassium carbonate, a potassium hydrogencarbonate, an ammonia, an amine, an imine, an amino acid, a hydroxylamine derivative, a hydrazine derivative or the like. The molar amount of such a base to be used may be about 1.1 times or more, preferably about 1.5 times or more, and about 20 times or less, preferably about 10 times or less, based on the stoichiometric molar amount of base for converting the titanium compound to titanium hydroxide. The reaction can be conducted at a temperature of about 70° C. or lower, preferably at a temperature of about 60° C. or lower, and even more preferably at a temperature of about 55° C. or lower. The temperature may be about 0° C. or higher, and is preferably about 5° C. or higher. Alternatively, the titanium hydroxide can be produced by heating the aqueous solution of the titanium compound to a temperature, for example, of about 95° C. or higher to carry out hydrolysis of the titanium compound.

The titanium peroxide can take at least 3 general forms for the calcination. For example, the titanium peroxide can be a compound in which some of its Ti—O—H bonds in a titanium hydroxide (such as $Ti(OH)_2$, $Ti(OH)_3$, $Ti(OH)_4$ and $TiO(OH)_2$) have been replaced to Ti—O—O—H bonds or the like. Examples of such a titanium peroxide include $Ti(OH)_3OOH$. Further, the titanium peroxide can be a compound in which some of its Ti—O bonds in a titanium hydroxide (such as TiO, $Ti_2O_3$ and $TiO_2$) have been replaced to Ti—O—O bonds or the like. Examples of such a titanium peroxide include $TiO_2(OH)_2$. Furthermore, the titanium hydroxide may be a combination thereof, such as a compound encompassed by formula (I).

$$Ti(O_2)_xO_y(OH)_z \qquad (I)$$

wherein "x" represents more than 0 but less than 4 ($0<x<4$), "y" represents at least 0 but less than 2 ($0 \leq y<2$), and "z" represents at least 0 but less than 4 ($0 \leq z<4$). Examples of such a titanium peroxide include $Ti(O_2)(OH)_2$ and $Ti(O_2)O(OH)_2$. The titanium peroxide can be produced by mixing a hydrogen peroxide with the aqueous solution of the above-described titanium compound and then reacting the resulting mixture with a base. The molar amount of hydrogen peroxide to be used in such a case may be at least about 0.1 time, preferably at least about 1 time, and may be at most about 5 times, of the molar amount of titanium atom present in the titanium compound. Similar to the above, the utilized base may be a sodium hydroxide, a sodium carbonate, a sodium hydrogencarbonate, a potassium hydroxide, a potassium carbonate, a potassium hydrogencarbonate, an ammonia, an amine, an imine, an amino acid, a hydroxylamine derivative, a hydrazine derivative or the like. The amount of the base to be used may be about 1.1 times or more, preferably about 1.5 times or more, and about 20 times or less, preferably about 10 times or less, based on the stoichiometric molar amount of base for converting the titanium compound to titanium peroxide. The reaction with the base may be conducted at a temperature of about 65° C. or lower, is preferably at about 60° C. or lower, and is even more preferably at about 55° C. or lower. The temperature may be about 0° C. or higher, and is preferably 5° C. or higher.

The thus-obtained titanium oxide precursor can be washed, if needed. The washing can be conducted by utilizing water or a hydrogen peroxide, which may be followed by a procedure involving filtration, centrifuge, decantation or the like.

The titanium oxide precursor (which may be optionally washed as described above) is typically calcined in the presence of steam (or water vapor) and nitrogen gas, wherein the steam pressure is at most about 8,000 Pa. The lower the steam pressure is, the larger specific surface area the resulting titanium oxide tends to have. In this regard, it is preferable to conduct the calcination under the steam pressure of at most about 3,000 Pa, more preferably of at most about 600 Pa and even more preferably of at most about 200 Pa. Typically, the calcination is conducted at a total gas pressure of at least about 10,000 Pa, and preferably at least about 90,000 Pa. The calcination may be also conducted at a total gas pressure of at most about 200,000 Pa and preferably at most about 150,000 Pa. Although not outside the scope of the present invention, when the total pressure is lower than the above lower limit, heat transmission during the calcination can be lowered, which results in lowering heat efficiency in the calcination.

The calcination is typically conducted in the presence of nitrogen molecules. The amount of nitrogen molecules in the calcination environment may be at least about 50% by volume, and is preferably at least about 70% by volume, based on the total volume of the total gas volume in the environment. The calcination may also be carried out in the presence of other gases, such as a helium, a neon, an argon, a krypton, a xenon, a carbon dioxide, a nitrogen oxide, a nitrogen dioxide, an ammonia, an oxygen and the like.

The steam pressure and the nitrogen-molecules amount in the calcination environment can be regulated by introducing a gas into the calcination environment. It is preferable that the gas is prepared to have the appropriate steam pressure and/or nitrogen-molecules amount before introducing the gas into the calcination environment. The gas is typically nitrogen and/or the other gas as above-described, such as a helium, a neon, an argon, a krypton, a xenon, a carbon dioxide, a nitrogen oxide, a nitrogen dioxide, an ammonia, an oxygen and the like. In order to adjust the stream pressure, such gases may be prepared by compressing the provided gas, condensing the steam (or water vapor) present in the gas, removing the condensed steam from the gas, and then decompressing the gas. The gases may also be prepared by treating the provided gas with a dehumidifier, a moisture absorbent or the like to remove the steam from the gas. In order to adjust the nitrogen-molecules amount, an additional gas (such as nitrogen and the other gas), which may have been dehumidified, can be introduced into the calcination environment.

The environment for the calcination can be maintained in a furnace that can maintain a sufficient temperature, the nitrogen amount for the calcination and the steam pressure for the calcination. Examples of such a furnace include a tunnel furnace, a far infrared radiation furnace, a microwave furnace, a shaft furnace, a reverberatory furnace, a rotary furnace, a roller herce furnace, a pneumatic conveying dryer, a flowing furnace, a tubular-type electric furnace, a box-type electric furnace and the like. It is preferable that the furnace can provide a gas from outside of the calcination environment into the calcination environment. The gas may be heated before or after being introduced into the calcination environment. Typically, such preferred types of the furnaces have a device for controlling the amount of gas introduced into the calcination environment. Such preferred types of furnaces provide easier control over the steam pressure and the nitrogen amount in the calcination environment. For example, such preferred types of furnaces can more easily regulate the fluctuations of steam pressure and nitrogen amount arising from the steam released from heating the titanium oxide precursor.

Figure 2:
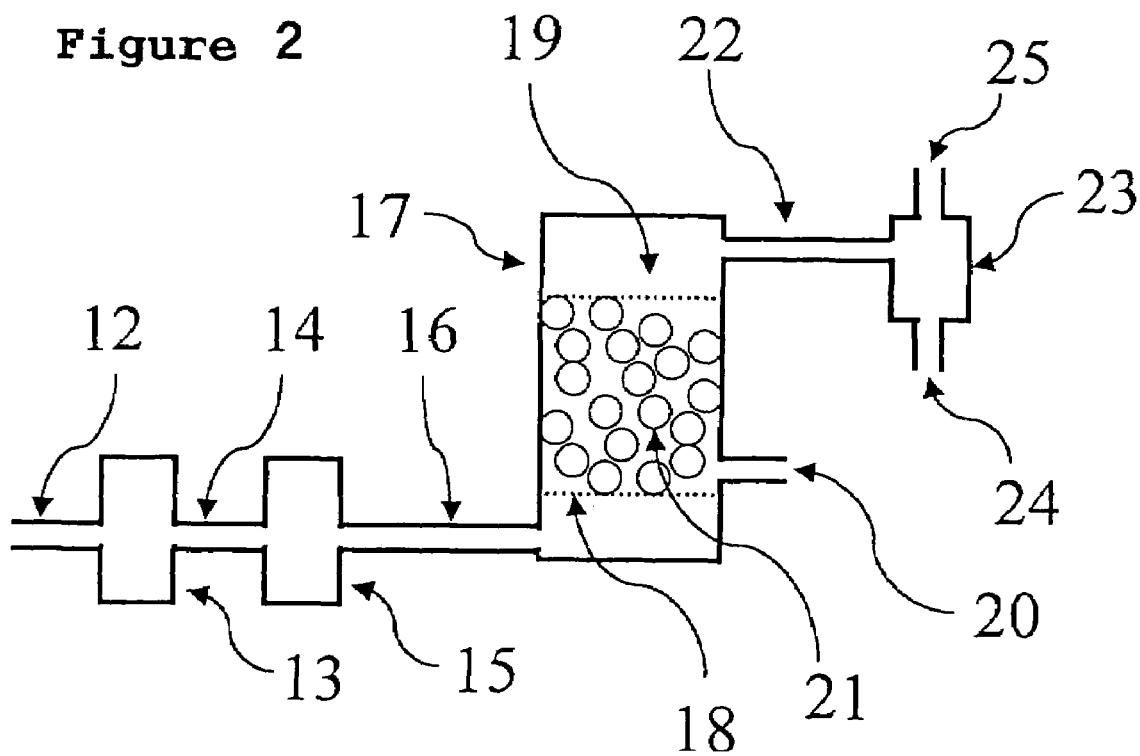
FIG. 2 shows a schematic diagram of a fluidized-bed furnace which can be used in the present invention.
Figure 3:
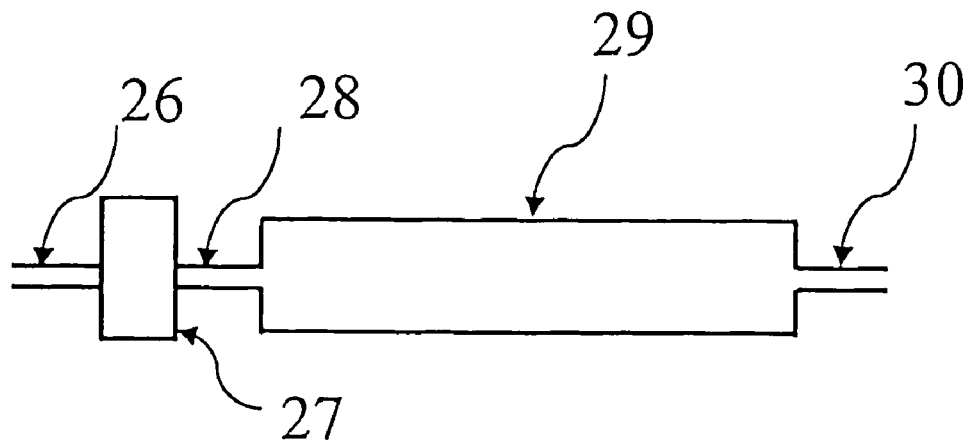
FIG. 3 shows a schematic diagram of a tubular-type furnace which can be used in the present invention.

Illustrations of the furnace are given in FIGS. 1, 2 and 3. The devices depicted in FIGS. 1 and 2 are devices which can continuously deliver the calcination product out of the calcination device, while the titanium oxide precursor is continuously added to the device. The device depicted in FIG. 3 is a device which can calcine the titanium oxide precursor by, first, adding the titanium oxide precursor to the calcination device; second, stopping the addition of the titanium oxide precursor; and third, adding hot gas into the calcination device.

The device depicted in FIG. 1 is typically known as a pneumatic conveying dryer. The air-blow furnace has pipes 1, 3, 5 and 8, a dehumidifier 2, a heater 4, a main chamber 6, a feeding inlet 7, a separator 9, a solid exit 10 and a gas exit 11. Pipe 1 is for introducing gas such as an air and is connected to the dehumidifier 2. Pipe 3 connects the dehumidifier 2 to the heater 4. Pipe 5 connects the heater 4 to the main chamber 6. Pipe 8 connects the main chamber 6 to the separator 9. In the pneumatic conveying dryer, the titanium oxide precursor is introduced into the main chamber 6 through the feeding inlet 7 and contacts the hot gas introduced through pipe 5. The hot gas carries the titanium oxide precursor so that the titanium oxide precursor circulates around the main chamber 6 and is calcined. The calcination product is delivered to the separator 9 through the pipe 8 to separate the calcination product from the gas. The calcination product exits through the solid exit 10. The gas containing the steam arising from heating the titanium oxide precursor exits through the gas exit 11. Further, the pneumatic conveying dryer typically has a thermometer located at one or two or more locations in the main chamber 6 to monitor the calcination temperature. The gases, such as an ammonia and a nitrogen, which have been dehumidified, can be introduced into the pipe 3 or pipe 5 to regulate the calcination environment. While FIG. 1 depicts an pneumatic conveying dryer with one chamber, the pneumatic conveying dryer may have 2 or more chambers to regulate the residence time (or calcination time) of the titanium oxide precursor in the furnace. In such cases, the chambers may be connected with one another. The pneumatic conveying dryer may have another pipe (not shown) which connects the solid exit 10 with the feeding inlet 7 so that the calcination product from the solid exit 10 is introduced into the furnace to be calcined again.

Further, the device shown in FIG. 2 is known as a flowing furnace. The flowing furnace has pipes 12, 14, 16 and 22, a dehumidifier 13, a heater 15, a main chamber 17, a feeding inlet 20, a separator 23, lattice boards 18 and 19, medium 21, a solid exit 24 and a gas exit 25. Pipe 12 is for introducing gas such as an air and is connected to the dehumidifier 13. Pipe 14 connects the dehumidifier 13 to the heater 15. Pipe 16 connects the dehumidifier 15 to the main chamber 17. Pipe 22 connects the main chamber 17 to the separator 23. In the flowing furnace, the lattice boards 18 and 19 are located at the upper and lower portions, respectively, in the main chamber 17. The main chamber 17 is packed with medium 21. The titanium oxide precursor is introduced into the main chamber 17 through the feeding inlet 20 and contacts the hot gas introduced through pipe 16. The titanium oxide precursor is calcined while flowing in the main chamber 17. The calcination product is delivered to the separator 23 through the pipe 22 to separate the calcination product from the gas. The calcination product exits through the solid exit 24. The gas containing the steam arising from heating the titanium oxide precursor exits through the gas exit 25.

The device depicted in FIG. 3 may be called a tubular-type electric furnace. The tubular-type electric furnace has pipes 26 and 28, a dehumidifier 27, a heater (not shown), a tubular main chamber 29 and a gas exit 30. Pipe 26 is for introducing gas such as an air and is connected to the dehumidifier 27. Pipe 28 connects the dehumidifier 27 to a main chamber 29. The heater is installed for heating the inside of the main chamber 29. Examples of the heater include a resistance heater, an induction heater and the like. In the tubular-type electric furnace, the titanium oxide precursor is placed into the main chamber 29. The gas introduced into pipe 26 is treated in the dehumidifier 27 so as to have an appropriate steam pressure, and is then introduced into the main chamber 29 through pipe 28. The gas is heated in the main chamber 29. The titanium oxide precursor is calcinated in the main chamber 29 by maintaining the heat and environment provided by the gas introduced through pipe 28. The gas containing the steam arising from heating the titanium oxide precursor exits through gas exit 30. After the calcination, the main chamber 29 is cooled so that the calcination product can be removed from the main chamber 29.

When the gas is introduced into a calcination device (such as a furnace), the total volumetric amount of the gas to be introduced may be at least about 100 times and is preferably at least about 1,000 times, in terms of the volume converted in a standard state, based on the total volume of the titanium oxide precursor to be calcined. As used herein, "standard state" refers to an environment at 20° C. under 1 atmosphere.

The temperature of the calcination is a temperature at which the titanium oxide precursor can be converted to a titanium oxide. The calcination may be conducted at a temperature of at least about 200° C., is preferably at least about 250° C., and is more preferably at least about 300° C. Further, the calcination may be conducted at a temperature of at most about 650° C., is preferably at most about 550° C., and is more preferably at most about 500° C.

The period of time for the calcination may depend on the type of furnace utilized for the calcination and the calcination temperature. The calcination may be conducted for at least about 10 minutes and is preferably at least about 30 minutes. Further, the calcination may be conducted at most about 24 hours.

In accordance with the present invention, a titanium oxide having a large specific surface area, which is useful for a catalyst, can be easily produced.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2002-369748 filed on Dec. 20, indicating specification, claims, drawings and summary, are incorporated herein by reference in their entirety.

EXAMPLES

The present invention is described in more detail by following Example, which should not be construed as a limitation upon the scope of the present invention.

In Example and Comparative example below, crystallinity phase and BET specific surface area of the produced titanium oxide were obtained in accordance to the following methods.

Crystallinity:

Using an X-ray diffraction apparatus (device name: RAD-IIA, manufactured by Rigaku Corporation), an X-ray diffraction spectrum of the titanium oxide was measured under the condition of:
X-ray tube: Cu,
tube voltage: 40 kV,
tube current: 35 mA,
diffusion slit: 1 degree,
scattering slit: 1 degree,
light income slit: 0.30 mm,
sampling width: 0.020 degree, and
scanning rate: 2.00 degree/min., and crystallinity of the titanium oxides was examined from the obtained spectrum.

BET Specific Surface Area:

The BET specific surface area ($m^2/g$) was measured in a nitrogen absorption method using an automatic specific surface area measurement device (device name: Monosorb, manufactured by Yuasa Ionics, Co., Ltd.). The measurement of the BET specific surface area was conducted under the condition of:
Desorption temperature: 200° C.,
Desorption time: 30 minutes, and
Absorption temperature: −196° C. (77 K).

Example 1

An aqueous solution of titanium oxysulfate was prepared by dissolving 3388 g of a titanium oxysulfate (manufactured by Tayca Corporation) in 2258 g of ion exchange water. A thousand three hundred seven grams (1307 g) of a 35% aqueous hydrogen peroxide solution was added to the aqueous solution of titanium oxysulfate, under ice cooled conditions. In the resulting mixture, the molar amount of the hydrogen peroxide was 1 time based on the amount of titanium atom of the titanium oxysulfate therein.

Four thousand seven hundred grams (4,700 g) of ion exchange water was added to a reaction container that was equipped with a pH controller pH electrodes and a pH controller which connects to the pH electrodes and supplies a 25% by weight of aqueous ammonia (special grade, manufactured by Wako Pure Chemical Industries, Ltd.) so as to adjust the pH of a liquid in the reaction container to be constant. The pH predetermined value of the pH controller was set to 4. The supplying rate of the aqueous ammonia was set to 50.3 ml/min. When a pH value of a liquid in the reaction container becomes lower than the predetermined value, the aqueous ammonia is begun to be supplied, and the supplying was continued at the above-mentioned supplying rate until the pH of the liquid attains to the predetermined value. The above-obtained mixure was added to the reaction container at a rate of 50.3 ml/min, while stirring the resulting mixture in the container at 145 rpm, to react with the aqueous ammonium which was supplied to the container by the pH controller. The reaction temperature was from 24° C. to 55° C. The obtained reaction mixture was maintained for 1 hour with stirring, and then was supplied with a 25% by weight of aqueous ammonia (special grade, manufactured by Wako Pure Chemical Industries, Ltd.) to obtain a slurry. The total amount of the aqueous ammonia supplied to the reaction vessel was 3746 g, which was 2 times the amount needed to stoichiometrically convert the titanium oxysulfate into a titanium hydroxide. The slurry was filtered to obtain a solid therein. The obtained solid was washed with ion exchanged water and was dried in the air at 150° C. for 15 hours to obtain a powder of titanium oxide precursor. The obtained titanium oxide precursor was a white powder containing a titanium peroxide.

Figure 4:
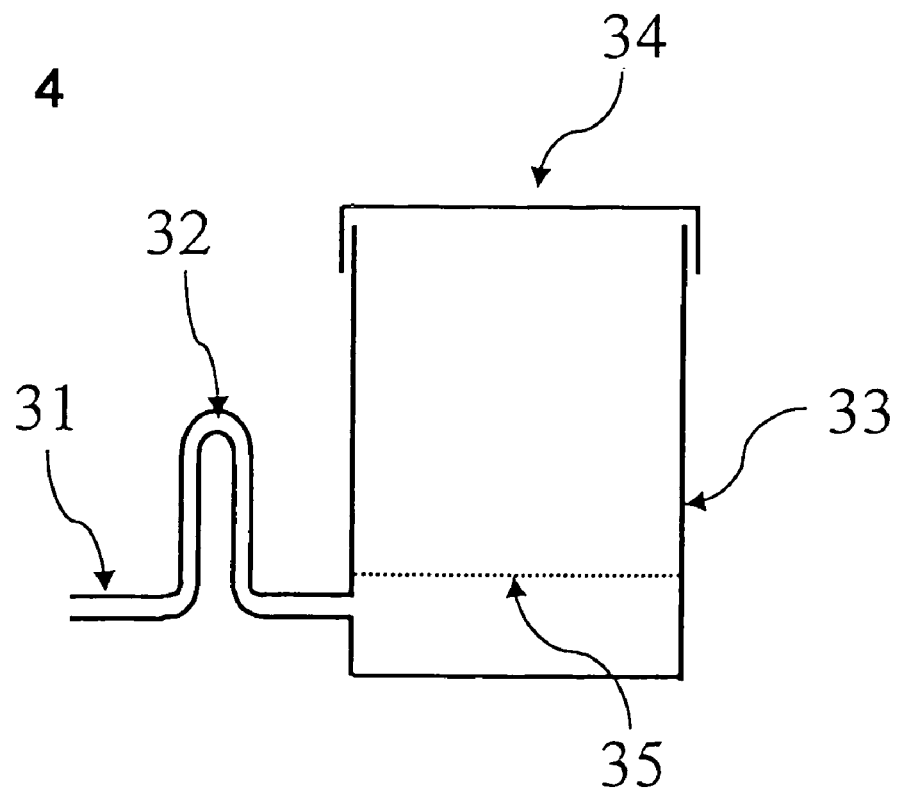
FIG. 4 shows a schematic diagram of a device which can be employed in the present invention (see, Example 1).

The titanium oxide precursor was calcined using the device depicted in FIG. 4. The device comprised pipes 31 and 32, a main chamber 33, a cover 34 placed for the main chamber and a shelf 35 in the main chamber 33. Pipe 31 was connected to the pipe 32, which was connected to the main chamber 33. Pipe 31 was utilized to introduce gas and was connected to pipe 32. Pipe 32 was utilized to heat a gas introduced therein.

Twenty grams (20 g) of the titanium oxide precursor was thinly spread on the shelf 35, so that the thickness thereof was low. After the cover 34 was placed on the main chamber 33, the device was placed in a furnace (trade name: Super-temp Oven, manufactured by Asahi Kagau Co., Ltd.). The main chamber was heated to 370° C. at a rate of 200° C./hour and was maintained at 370° C. for 1 hour to calcine the titanium oxide precursor to obtain a titanium oxide, while introducing a gas which had been prepared to have a steam pressure of 2,500 Pa. The gas introduced in the main chamber had a total pressure of 101,000 Pa, had a nitrogen amount of 79% by volume, and had also present therein oxygen, carbon dioxide and argon. The gas was introduced into the main chamber 33 from outside of the furnace and through pipe 31 at a rate of 1 L/minute.

The device was allowed to cool to a room temperature of about 25° C. Then, the titanium oxide was recovered from the main chamber 33. The total amount of gas introduced into the main chamber 33 was 9,000 times by volume in terms of the volume converted in the standard state, based on the volume of the titanium oxide precursor. The properties of the titanium oxide are shown in Table 1. Furthermore, the titanium oxide showed a photocatalytic activity by irradiation of a visible light having a wavelength of at least 430 nm. With the photocatalytic activity, an aldehyde was able to be decomposed to a carbon dioxide.

Comparative Example 1

A titanium oxide was obtained with the same procedures as described in Example 1, except that the steam pressure of the gas introduced into the main chamber 33 was changed to 10,100 Pa. The properties of the titanium oxide are shown in Table 1.

TABLE 1

|  | Example 1 | Comparative Example 1 |
|---|---|---|
| Main crystallinity | Anatase | Anatase |
| BET specific surface area (m$^2$/g) | 81 | 55 |

I claim:

1. A method for producing a titanium oxide, the method comprising
    adjusting a gas to have a prescribed steam pressure before introducing the gas into a furnace, and
    calcining at least one titanium oxide precursor selected from the group consisting of a titanium hydroxide and a titanium peroxide,
    wherein said calcination is conducted in the presence of nitrogen molecules and at a steam pressure of at most about 8,000 Pa, and
    said calcination is conducted in the furnace into which the gas is introduced,
    wherein the gas has a steam pressure of at most about 8,000 Pa.

2. The method according to claim 1, further comprising the step of reacting a titanium compound in the aqueous solution thereof with a base to obtain the titanium oxide precursor.

3. The method according to claim 1, further comprising the step of mixing an aqueous solution of a titanium compound with a hydrogen peroxide and reacting the resulting mixture with a base to obtain the titanium oxide precursor.

4. The method according to claim 2 or 3, wherein the titanium compound is at least one compound selected from the group consisting of a titanium chloride, a titanium oxychloride, a titanium sulfate and a titanium oxysulfate.

5. The method according to any one of claims 1 to 3, further comprising the step of washing said at least one titanium oxide precursor before the calcination.

6. The method according to claim 1, wherein the calcination is conducted under a total gas pressure of at least about 10,000 Pa.

7. The method according to claim 1, wherein the calcination is conducted in a furnace into which a gas is introduced, wherein the gas has the volumetric amount of at least about 100 times in terms of the volume converted in the standard state, based on the total volume of the titanium oxide precursor.

8. The method according to claim 1 or 7, wherein the gas contains nitrogen molecules, has a steam pressure of at most about 8,000 Pa and has the volumetric amount of at least about 100 times in terms of the volume converted in a standard state based on the volume of the titanium oxide precursor.

* * * * *